United States Patent [19]

Månsson

[11] 4,268,350
[45] May 19, 1981

[54] METHOD OF TREATING PULP BLEACHING EFFLUENTS

[75] Inventor: Inge G. Månsson, Kungälv, Sweden

[73] Assignee: EKA Aktiebolag, Surte, Sweden

[21] Appl. No.: 76,745

[22] Filed: Sep. 18, 1979

[30] Foreign Application Priority Data

Oct. 25, 1978 [SE] Sweden ............................... 7811089

[51] Int. Cl.³ .................................................. D21C 11/00
[52] U.S. Cl. .................................. 162/29; 162/30 R;
162/30 K; 162/DIG. 8; 210/651
[58] Field of Search ..................... 162/29, DIG. 8, 16,
162/30 K; 210/23 F

[56] References Cited

U.S. PATENT DOCUMENTS 4,155,845  5/1979  Ancelle et al. ......................... 162/29

OTHER PUBLICATIONS

Empire State Paper Research Institute, Research Report No. 69, 10/1/78.
Revue ATIP, vol. 28, No. 1, 1974, p. 9–15.

*Primary Examiner*—William F. Smith
*Attorney, Agent, or Firm*—Young & Thompson

[57] ABSTRACT

A method for cleaning effluents from bleaching plants which use ultrafiltration for cleaning, preferably after the first extraction stage, by dividing the ultrafiltration into two stages, and between them inserting an alkali treatment stage. The high molecular chlorine compounds are thereby split into innocuous sodium chloride in the permeate from the second ultrafiltration stage, which can be returned to the extraction stage so that with the alkali excess after the splitting, it can cover all or part of its alkali requirement.

9 Claims, No Drawings

METHOD OF TREATING PULP BLEACHING EFFLUENTS

The cellulose industry has been responsible for a large share of the pollution in lakes and rivers, as well as in the atmosphere, but through large-scale investments this pollution has been able to be radically reduced.

Closed plant water systems for pulping, washing and screening have been introduced, as well as flue gas filtering and scrubbing and condensation treatment. Other bases than calcium, with the associated recycling system, have also come into use in the sulphite industry. This has increased the relative importance of bleaching plant effluents, and work is now in progress to take care of bleaching plant effluents as well.

Oxygen bleaching is an established technique for sulphate pulp processing and certain branches of sulphite pulp processing, and has been responsible for reducing the discharge of bleaching plant contaminants by about one half.

Work is also in progress on making a completely closed water system in a bleaching plant together with the existing recycling system. Such systems are under construction in Canada. Such systems involve, however, the enrichment of chlorides, partly from the chlorine from the bleaching, and partly from the salt content of the wood which, if it has been floated in seawater, can be quite high. Therefore the process places great demands on the construction materials and requires a complicated, multi-step crystalization to keep down the percentage of salts in the system.

Both of these systems should be integrated into the plant at its construction, to avoid unreasonable costs and connection problems.

The out-flow from existing bleaching plants can also be treated externally in treatment units connected at the end of the bleaching plant. Add-on systems to existing plants primarily involve precipitation, adsorption, biological treatment or ultrafiltration.

Precipitation with lime, iron salts and/or aluminum salts is an old, well-established technique in many contexts, but it requires the addition of less desirable chemicals. Disposal problems can also be difficult, considering the large volumes involved.

Adsorption cleaning is especially suitable where large volumes of water containing small amounts of impurities are concerned. The impurities fasten onto an adsorbent medium, such as activated carbon or an ion exchange material, which is regenerated after saturation; an operation which is, with today's technology, both expensive and laborious.

Biological cleaning is a technique which is also expensive, because the necessary lagoons often involve large investments. Aerated lagoons in combination with ultrafiltration are otherwise an ideal solution, primarily because those substances which are most easily degraded can only be removed to a small degree by ultrafiltration. The easily degradable substances are thus removed more quickly in the subsequent lagoon with a more or less complete cleaning as a result. An advantage of this method is that it does not require any chemical additives.

Common to these external methods is that a substance is removed from the effluents and is enriched in some manner to a concentrate which is then subjected to secondary treatment.

The normal sequence in a bleaching plant includes the steps chlorine, alkali, hypochlorite, chlorine dioxide, alkali, chlorine dioxide, i.e. in the usual notation CEHDED. The major portion of the discharge from the bleaching plant comes from the first alkali stage, $E_1$, and this amount is also the easiest to handle with regard to volume. Ultrafiltration of the discharge from the $E_1$ stage has been shown to function well in practice and provide improvement in cleaning at reasonable costs. Ultrafiltration is easily connectable to the $E_1$ stage of the bleaching plant and has obvious advantages over other methods.

An ultrafiltration unit consists of a prefilter for removing fibers and other suspended material in addition to the main ultrafiltration unit, which consists of a number of cells or stages coupled in series, in which the E filtrate is successively reduced in volume by removal of the permeate. The ultrafiltration is carried out at an input pressure of, for example, 5–10 bar and the pressure drop in each cell is overcome with a pressure booster pump. By varying the operating pressure and the temperature, variations in load can be met.

From the ultrafiltration 2–5% of the incoming amount is led off as a concentrate with about 90% of the color of the E filtrate, as well as 95–98% of the incoming volume as a permeate with relatively weakly colored, low molecular, organic remnants and inorganic chlorides. In the normal process, the boundary for separation lies at a molecular weight of 1000–2000 and the concentrate contains high molecular lignin remnants and carbohydrates while the permeate contains the majority of the salts and low molecular organic substance from the E stage.

Ultrafiltration and its application in the cellulose industry is reported on in detail in Revue A.T.I.P., vol. 28, No. 1, 1974.

In normal chlorination and extraction of pine sulphate pulp, 10–12 kg chlorine/ton of pulp are released in the liquor treatment in the extraction stage. In the filtrate therefrom 3–4 kg/ton chlorine is organically bonded while the rest is sodium chloride. About 70% of the organic bound chlorine is present in molecules with a molecular weight greater than 10,000, while 25% is in the molecular weight range of 1000–10,000.

After ultrafiltration, about 90% of the organically bound chlorine is present in the concentrate, i.e. 3–3.5 kg/ton together with a smaller amount, 0.3–0.4 kg/ton corresponding to 4% at 96% degree of concentration of the inorganic chlorine. A bleaching unit for 600 tons of sulphate pulp with a purification to 90% of the effluent from the first E stage with ultrafiltration appears approximately as follows:

| | Ultrafiltration of effluents from $E_1$ stage in a bleaching plant for 600 ton sulphate pulp | | |
|---|---|---|---|
| | Input | Output, permeate | Concentrate |
| Volume, m³ | 6000 | 5750 | 250 |
| Dry solids content, tons | 40 | 22(·) | 18 |
| Total chlorine, tons | 7 | 5 | 2 |
| Color, Pt, tons | 70 | 7 | 63 |
| KS, tons | 12 | 4 | 8 |
| BS, tons | 4 | 2 | 2 |

(·) 12 tons organic, 10 tons NaCl.

Since the incineration of the concentrate is most simply done in the existing recycling system by burning in the soda recovery boiler, the entire amount of chlorine which was bonded organically in bleaching as high molecular chlorinated lignins will be combusted and provide a substantial addition of sodium chloride to the recovery system. The chloride causes increased corrosion, risk of tube breakage in the soda recovery boiler and other problems. Therefore is is especially desirable to keep the chlorine lignin content and thus the chloride increase from the bleaching plant to the soda boiler as low as possible. The present invention relates to a method of substantially reducing the chloride increase which is produced by the fraction of organically bonded chlorine after the incineration of the concentrate in the soda boiler.

In addition to this main purpose of the invention, it should also be mentioned that when the chlorine lignin content is reduced in accordance with the invention, the undesirable environmental effects of any discharge by leakage or spill will be reduced correspondingly.

It is previously known in the alkali treatment of chlorine lignins at elevated temperature to split them into the corresponding phenols and sodium chloride. An E filtrate is concentrated to 95% with ultrafiltration and is treated with caustic soda with varying concentrations, and the following results were obtained:

TABLE 1

| Lye feed | Samples | | | | Split organic chlorine, % |
|---|---|---|---|---|---|
| | Untreated | | After boiling 22 h | | |
| | Inorganic Cl | Organic Cl | Inorg. Cl | Org. Cl | |
| 5% NaOH | 0.7 | 3.0 | 2.3 | 1.4 | 53 |
| 20% NaOH | 0.7 | 3.0 | 2.5 | 1.2 | 60 |

The contents are given in g/kg solution.

The major portion of the splitting takes place during the first hours of the treatment.

According to the invention such a splitting is used to reduce the percentage of organic chlorine in the concentrate to the soda recovery boiler, by inserting a treatment stage with alkali in the ultrafiltration. After a first ultra-filtration stage the concentrate produced is treated with caustic soda and is then treated further in a second ultra-filtration stage. The sodium chloride formed by splitting with alkali is present in the permeate and produces upon recycling to the recovery system an appreciably reduced chloride increase.

The strongly alkaline, second permeate which also contains a relatively large amount of organic substance returns to the alkali stage as its alkali source. The caustic soda is returned in this manner to the process stage which it is normally intended for and there are no losses. For technical control reasons, however, a portion of the alkali is added directly to the extraction stage 1 without first having been used for the chlorine lignin hydrolysis.

The invention with be described in more detail in connection with an example.

The filtrate from the first alkali stage in a bleaching plant for sulphate pulp was introduced into the 12-cell ultrafiltration unit in an amount of 10 $m^3/t$ pulp and containing 8 kg inorganically bonded chlorine/t pulp and 4 kg/t organically bonded chlorine. After passage through 10 cells, 9.6 $m^3/t$ permeate was taken out containing 7.7 kg/t of inorganic chlorine and 0.4 kg/t of organic chlorine. This permeate I could be released directly as effluent to a recipient without causing any ecological disturbances. The concentrate was treated with 0.1 $m^3/t$ caustic soda with a concentration of 250 g/l at a temperature of 100° C. for two hours, and was then conducted after cooling in the heat exchanger through the remaining two cells in the ultrafiltration unit. 0.4 $m^3/t$ permeate II was obtained therefrom containing 2.0 kg/t inorganic chlorine and 0.1 kg/t organic chlorine and 17 kg/t NaOH, as well as 0.1 $m^3/t$ concentrate with 0.5 kg/t inorganic chlorine, 1.3 kg/t organic chlorine and 5 kg/t NaOH. The permeate II was conducted to the alkali stage $E_1$ as a portion of the volume of alkali required there, and the concentrate went to the soda furnace for burning and use of the alkali in recycling.

What I claim is:

1. A method of cleaning effluents from pulp bleaching plants, containing high molecular weight organic chlorine compounds, comprising ultrafiltering the effluent to produce a permeate and a concentrate containing high molecular weight chlorine compounds, contacting the concentrate with alkali to split a portion of the high molecular weight chlorine compounds in the concentrate into phenols and alkali chloride, and again ultrafiltering the alkali-treated material.

2. A method as claimed in claim 1, performed in a bleaching schedule CEHDED, the ultrafiltration being applied to the effluent from the $E_1$ stage.

3. A method as claimed in claim 1, in which the two ultrafiltrations are performed in stages of which the first is substantially larger than the second.

4. A method as claimed in claim 1, in which said alkali contacting takes place at elevated temperature.

5. A method as claimed in claim 4, in which said elevated temperature is about 100° C.

6. A method as claimed in claim 1, in which said alkali contacting is performed with a large excess of caustic soda.

7. A method as claimed in claim 1, performed in a bleaching schedule CEHDED, in which the permeate from the second ultrafiltration stage is returned to the $E_1$ stage as the major portion of the required amount of alkali.

8. A method as claimed in claim 1, and discharging the permeate from the first ultrafiltration to a recipient.

9. A method as claimed in claim 1, and burning the concentrate from the second ultrafiltration in a soda furnace.

* * * * *